(12) United States Patent
Boualleg et al.

(10) Patent No.: US 10,723,960 B2
(45) Date of Patent: Jul. 28, 2020

(54) METHOD FOR HYDROCRACKING HYDROCARBON FEEDSTOCKS USING A CATALYST COMPRISING A ZEOLITE AND AN AMORPHOUS MESOPOROUS ALUMINA

(71) Applicant: IFP Energies nouvelles, Rueil-Malmaison (FR)

(72) Inventors: Malika Boualleg, Villeurbanne (FR); Antoine Daudin, Corbas (FR); Emmanuelle Guillon, Vourles (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 19 days.

(21) Appl. No.: 16/060,069

(22) PCT Filed: Nov. 16, 2016

(86) PCT No.: PCT/EP2016/077788
§ 371 (c)(1),
(2) Date: Jun. 7, 2018

(87) PCT Pub. No.: WO2017/097551
PCT Pub. Date: Jun. 15, 2017

(65) Prior Publication Data
US 2018/0362861 A1 Dec. 20, 2018

(30) Foreign Application Priority Data

Dec. 8, 2015 (FR) ..................... 15 61975

(51) Int. Cl.
| | | |
|---|---|---|
| *C10G 47/20* | (2006.01) | |
| *B01J 29/78* | (2006.01) | |
| *B01J 29/16* | (2006.01) | |
| *B01J 37/03* | (2006.01) | |
| *B01J 21/04* | (2006.01) | |
| *B01J 29/08* | (2006.01) | |
| *B01J 37/00* | (2006.01) | |
| *C10G 47/16* | (2006.01) | |
| *B01J 37/08* | (2006.01) | |

(52) U.S. Cl.
CPC ............. *C10G 47/20* (2013.01); *B01J 21/04* (2013.01); *B01J 29/084* (2013.01); *B01J 29/166* (2013.01); *B01J 29/7815* (2013.01); *B01J 37/0045* (2013.01); *B01J 37/036* (2013.01); *B01J 37/08* (2013.01); *C10G 47/16* (2013.01); *B01J 2229/20* (2013.01); *B01J 2229/42* (2013.01); *C10G 2300/1074* (2013.01)

(58) Field of Classification Search
CPC .......... C10G 47/16; C10G 47/20; B01J 21/04; B01J 29/084; B01J 29/106; B01J 29/146; B01J 29/166; B01J 29/7007; B01J 29/7215; B01J 29/7615; B01J 29/7815; B01J 37/036; B01J 37/08; B01J 37/0045
See application file for complete search history.

(56) References Cited

U.S. PATENT DOCUMENTS

| | | | |
|---|---|---|---|
| 6,713,428 B1 | 3/2004 | Le Goff et al. | |
| 2011/0083999 A1* | 4/2011 | Simon ................... | B01J 29/064 208/88 |
| 2014/0367311 A1* | 12/2014 | Yu ........................... | B01J 21/12 208/213 |

FOREIGN PATENT DOCUMENTS

| | | |
|---|---|---|
| CN | 104588082 A | 5/2015 |
| FR | 2572307 A1 | 5/1986 |

OTHER PUBLICATIONS

International Search Report PCT/EP2016/077788 dated Jan. 18, 2017.

* cited by examiner

*Primary Examiner* — Renee Robinson
(74) *Attorney, Agent, or Firm* — Millen White Zelano and Branigan, PC; John Sopp

(57) ABSTRACT

The present invention describes a process for hydrocracking at least one hydrocarbon feed in which at least 50% by weight of the compounds have an initial boiling point of more than 300° C. and a final boiling point of less than 540° C. using at least one catalyst comprising at least one metal from group VIB and/or at least one metal from group VIII of the periodic classification of the elements and a support comprising at least one zeolite containing at least one series of channels the opening of which is defined by a ring containing 12 oxygen atoms (12MR), and at least one binder, said support being prepared from a highly dispersible alumina gel, said hydrocracking process being operated at a temperature in the range 200° C. to 480° C., at a total pressure in the range 1 MPa to 25 MPa, with a ratio of the volume of hydrogen to the volume of hydrocarbon feed in the range 80 to 5000 litres per litre and with an hourly space velocity (HSV), defined as the ratio of the volume flow rate of liquid hydrocarbon feed to the volume of catalyst charged into the reactor, in the range 0.1 to 50 $h^{-1}$.

9 Claims, No Drawings

METHOD FOR HYDROCRACKING HYDROCARBON FEEDSTOCKS USING A CATALYST COMPRISING A ZEOLITE AND AN AMORPHOUS MESOPOROUS ALUMINA

TECHNICAL FIELD

The present invention relates to a process for hydrocracking hydrocarbon feeds containing, for example, aromatic and/or olefinic and/or naphthenic and/or paraffinic compounds, including feeds obtained from the Fischer-Tropsch process and possibly containing metals and/or nitrogen and/or oxygen and/or sulphur.

The aim of the hydrocracking process is essentially the production of middle distillates, i.e. a kerosene cut with a boiling point in the range 150° C. to 250° C., and a gas oil cut with a boiling point in the range 250° C. to 380° C.

In particular, the present invention relates to the use, in a process for hydrocracking a hydrocarbon feed in which at least 50% by weight of the compounds have an initial boiling point of more than 340° C. and a final boiling point of less than 540° C., of a catalyst comprising at least one metal from group VIB and/or at least one metal from group VIII of the periodic classification of the elements and a support comprising at least one zeolite containing at least one series of channels the opening of which is defined by a ring containing 12 oxygen atoms (12MR), and at least one binder comprising at least one amorphous mesoporous alumina with a specific pore distribution, said alumina having a very high connectivity compared with prior art aluminas. Said amorphous mesoporous alumina is advantageously shaped from an alumina gel with a high dispersibility, said alumina gel in turn being obtained by precipitation of at least one aluminium salt in accordance with a specific process.

More particularly, the present invention relates to the use, in a process for hydrocracking said hydrocarbon feed, of a catalyst comprising a support comprising at least one zeolite and at least one binder comprising at least one amorphous mesoporous alumina, shaped from an alumina gel, said alumina gel being prepared in accordance with a preparation process involving a specific precipitation, in order to obtain at least 40% by weight of alumina with respect to the total quantity of alumina formed at the end of the gel preparation process, from the first precipitation step, the quantity of alumina formed at the end of the first precipitation step possibly even reaching 100%.

PRIOR ART

Hydrocracking heavy petroleum cuts is a very important refining process which can produce lighter fractions such as gasolines, jet fuels and light gas oils, which the refiner desires in order to adapt production to demand, from excess heavy feeds which are of low value. Certain hydrocracking processes can also produce a highly purified residue which can provide excellent base oils. In comparison with catalytic cracking, the importance of catalytic hydrocracking is to provide very good quality middle distillates. In contrast, the gasoline produced has a much lower octane number than that obtained from catalytic cracking.

Hydrocracking is a process which derives its flexibility from three principal elements, namely the operating conditions used, the types of catalysts employed and the fact that hydrocracking hydrocarbon feeds may be carried out in one or two steps.

The hydrocracking catalysts used in hydrocracking processes are all bifunctional in type, combining an acid function with a hydrogenating function. The acid function is provided by supports with surface areas which are generally from 150 to 800 m²/g and with superficial acidity, such as halogenated aluminas (in particular chlorinated or fluorinated), combinations of boron and aluminium oxides, amorphous silica-aluminas and zeolites. The hydrogenating function is provided either by one or more metals from group VIB of the periodic table of the elements, or by combination with at least one metal from group VIE of the periodic table with at least one group VIII metal.

The equilibrium between the two functions, acid and hydrogenating, is one of the parameters which governs the activity and selectivity of the catalyst. A weak acid function and a strong hydrogenating function produces catalysts with low activity, which generally operate at a high temperature (greater than or equal to 390° C.-400° C.), and at a low space velocity (the HSV, expressed as the volume of feed to be treated per unit volume of catalyst per hour, is generally less than or equal to 2), but endowed with a very high selectivity for middle distillates (jet fuels and gas oils). In contrast, a strong acid function and a weak hydrogenating function produce active catalysts which, however, have poor selectivity for middle distillates.

One conventional type of hydrocracking catalyst is based on moderately acidic amorphous supports such as silica-aluminas, for example. Such systems are used to produce good quality middle distillates, and possibly base oils. Such catalysts are used in once-through processes, for example. The disadvantage of such catalysts based on an amorphous support is their low activity.

Catalysts comprising, for example, a Y zeolite with structure type FAU, or catalysts comprising, for example, a beta type zeolite, though, have a higher catalytic activity than that of silica-aluminas, but have selectivities for middle distillates (jet fuels and gas oils) which are lower. This difference is attributed to the difference in the strengths of the acidic sites on the two types of materials.

The prior art testifies to a great deal of work aimed at improving the selectivity for middle distillates of zeolitic catalysts in hydrocracking processes. These latter are composed of a hydrogenating phase with a composition which can vary widely (different metals), generally deposited on a support containing a zeolite, usually Y zeolite. The hydrogenating phase is active in the sulphide form.

Examples which may be cited are the studies relating to modification of the Y zeolite, for example by dealumination by steaming or acid attack of the Y zeolite, to the use of composite catalysts, or to the use of small crystals of Y zeolites. Other patent applications such as WO2007/126419 describe the use of a mixture of zeolites such as beta and USY zeolites to improve the performances of hydrocracking catalysts.

In particular, the U.S. Pat. No. 7,790,652 describes a novel alumina support having a very specific pore distribution which may be used as a catalyst support in a process for the hydroconversion of heavy hydrocarbon feeds. Said support comprising alumina has a mean pore diameter in the range 100 to 140 Å, a size distribution wherein the width is less than 33 Å, and a pore volume of at least 0.75 mL/g in which less than 5% of the pore volume of said support is present in pores with a diameter of more than 210 Å.

Said support used in combination with an active hydrogenating phase can be used to obtain unexpected catalytic performances when it is used in the hydroconversion of heavy feeds preferably with a majority of its components boiling at a temperature of more than 343° C. In particular, the process for the hydroconversion of heavy feeds in accordance with U.S. Pat. No. 7,790,652 can be used to obtain a conversion of hydrocarbon compounds boiling at a temperature of more than 524° C. which is substantially improved compared with the conversions obtained with conventional prior art catalysts.

Said alumina support is prepared using a method comprising a first step for the formation of a dispersion of alumina by mixing, in a controlled manner, a first alkaline aqueous solution and a first acidic aqueous solution, at least one of said acid and basic solutions or both comprising an aluminium compound. The acidic and basic solutions are mixed in proportions such that the pH of the resulting dispersion is in the range 8 to 11. The acidic and basic solutions are also mixed in quantities which can be used to obtain a dispersion containing the desired quantity of alumina; in particular, the first step can be used to obtain 25% to 35% by weight of alumina with respect to the total quantity of alumina formed at the end of the two precipitation steps. The first step is operated at a temperature in the range 20° C. to 40° C. When the desired quantity of alumina has been formed, the temperature of the suspension is increased to a temperature in the range 45° C. to 70° C., then the heated suspension undergoes a second precipitation step by bringing said suspension into contact with a second aqueous alkaline solution and a second aqueous acidic solution, at least one of the two solutions or both thereof comprising an aluminium compound. Similarly, the pH is adjusted to between 8 and 10.5 by means of the added proportions of acidic and basic solutions and the remaining quantity of alumina to be formed in the second step is supplied by the added quantities of the two solutions, acidic and basic. The second step is operated at a temperature in the range 20° C. to 40° C. The alumina gel which is thus formed comprises at least 95% boehmite. The dispersibility of the alumina gel obtained thereby is not mentioned. The alumina gel is then filtered, washed and optionally dried using methods which are known to the skilled person without a prior hydrothermal treatment step, in order to produce an alumina powder which is then shaped using methods which are known to the skilled person, then calcined in order to produce the final alumina support.

The first precipitation step in the preparation process of U.S. Pat. No. 7,790,652 is limited to the production of a small quantity of alumina, in the range 25% to 35% by weight, because producing more alumina at the end of the first step does not allow for optimized filtration of the gel obtained. Furthermore, increasing the production of alumina in the first step of Shell's patent would not allow the gel obtained thereby to be shaped.

The Applicant has discovered that the use, in a process for hydrocracking a hydrocarbon feed, of a catalyst comprising at least one metal from group VIB and/or at least one metal from group VIII of the periodic classification and a support comprising at least one zeolite having at least one series of channels the opening of which is defined by a ring containing 12 oxygen atoms (12MR) and at least one binder comprising at least one amorphous mesoporous alumina prepared from a specific preparation process for obtaining a highly dispersible alumina gel could improve the selectivity for middle distillates while conserving or improving the catalytic activity of said zeolitic catalysts, compared with hydrocracking catalysts of the prior art.

In particular, the use in the catalyst support of a binder comprising at least said specific alumina with a high connectivity because of its preparation process means that overcracking of the treated feed can be avoided and thus the production of light products which cannot be incorporated into the middle distillates pool can be limited.

Thus, in one aspect, the present invention provides a process for hydrocracking at least one hydrocarbon feed in which at least 50% by weight of the compounds have an initial boiling point of more than 340° C. and a final boiling point of less than 540° C., employing at least one catalyst which has improved catalytic performances, in particular in terms of selectivity for middle distillates, while conserving or improving the catalytic activity of said zeolitic catalysts compared with prior art hydrocracking catalysts.

In another aspect, the invention provides a process for hydrocracking said hydrocarbon feed in order to produce middle distillate bases, in particular a kerosene base and/or a gasoil base, while limiting the production of light products which cannot be incorporated into said bases.

SUMMARY AND ADVANTAGE OF THE INVENTION

The present invention concerns a process for hydrocracking at least one hydrocarbon feed in which at least 50% by weight of the compounds have an initial boiling point of more than 300° C. and a final boiling point of less than 540° C., at a temperature in the range 200° C. to 480° C., at a total pressure in the range 1 MPa to 25 MPa, with a ratio of the volume of hydrogen to the volume of hydrocarbon feed in the range 80 to 5000 litres per litre and with an hourly space velocity (HSV), defined as the ratio of the volume flow rate of liquid hydrocarbon feed to the volume of catalyst charged into the reactor, in the range 0.1 to 50 $h^{-1}$, said process using at least one catalyst comprising at least one metal from group VIB and/or at least one metal from group VIII of the periodic classification and a support comprising at least one zeolite containing at least one series of channels the opening of which is defined by a ring containing 12 oxygen atoms (12MR), and at least one binder comprising at least one amorphous mesoporous alumina, said support comprising at least said zeolite and at least said binder being prepared in accordance with at least the following steps:

a) a step for precipitation, in an aqueous reaction medium, of at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being adjusted in a manner such as to obtain a percentage completion of said first step in the range 40% to 100%, the percentage completion being defined as being the proportion of alumina formed during said first precipitation step with respect to the total quantity of alumina formed at the end of step c) of the preparation process, said step being operated at a temperature in the range 20° C. to 90° C., and for a period in the range 2 minutes to 30 minutes, b) a step for hydrothermal treatment of the suspension heated to a temperature in the range 50° C. to 200° C. for a period in the range 30 minutes to 5 hours in order to obtain an alumina gel, c) a step for filtration of the suspension obtained at the end of the hydrothermal treatment step b), followed by at least one step for washing the gel obtained, d) a step for drying the alumina gel obtained at the end of step c) in order to obtain a powder,
e) a step for shaping the powder obtained at the end of step d) as a mixture with at least said zeolite containing at least one series of channels the opening of which is defined by a ring of 12 oxygen atoms (12MR), in order to obtain the green material,
f) a step for calcining the green material obtained at the end of step e) at a temperature in the range 500° C. to 1000° C., in the presence or absence of a stream of air containing up to 60% by volume of water.

One of the advantages of the present invention resides in employing, in a process for hydrocracking at least one hydrocarbon feed in which at least 50% by weight of the compounds have an initial boiling point of more than 340° C. and a final boiling point of less than 540° C., a zeolitic catalyst comprising a binder comprising an alumina prepared in accordance with a very specific process, from a highly dispersible alumina gel which is itself obtained in accordance with a very specific preparation process enabling said gel to be shaped. The alumina gel at the origin of the alumina used as the binder in the catalyst support is prepared by means of a precipitation step in which at least 40% by weight of the alumina with respect to the total quantity of alumina formed at the end of said gel preparation process is formed from the first precipitation step. This process is implemented by carrying out a step for hydrothermal treatment, and in particular a step for maturation, in order to obtain a support with an improved filterability, and facilitating shaping thereof.

The alumina preparation process can be used to obtain an alumina with a highly connected porosity, i.e. with a very high number of adjacent pores. A high connectivity represents a major advantage in the diffusion of molecules from said feed to be treated when carrying out the hydrocracking process in accordance with the invention using this material. Better diffusion of the reagents means that a more homogeneous concentration in the catalyst can be obtained, and thus it becomes possible to operate with a better and greater majority of the catalytic sites.

Throughout the remainder of the text, the "connectivity" of the alumina used as a binder for the catalyst used in the process in accordance with the invention is representative of the entirety of the porosity of the alumina, and in particular of the entirety of the mesoporosity of the alumina, i.e. the entirety of the pores with a mean diameter in the range 2 to 50 nm.

The connectivity is a relative parameter measured using the procedure described in the publication by Seaton (Liu H., Zhang L., Seaton N. A., Chemical Engineering Science, 47, 17-18, pp. 4393-4404, 1992). This is a Monte-Carlo simulation starting from nitrogen adsorption/desorption isotherms. These connectivity parameters are based on the theory of percolation. The connectivity is linked to the number of adjacent pores and represents an advantage for diffusion during catalytic reactions of the molecules to be treated.

Throughout the remainder of the text, the term "dispersibility index" is defined as the weight of peptised alumina gel which can be dispersed by centrifuging in a polypropylene tube at 3600 G for 10 min.

The dispersibility is measured by dispersing 10% of boehmite or alumina gel in a suspension of water also containing 10% of nitric acid with respect to the mass of boehmite. Next, the suspension is centrifuged at 3600 G rpm for 10 min. The collected sediments are dried overnight at 100° C. then weighed.

The dispersibility index, denoted DI, is obtained by carrying out the following calculation: DI (%)=100%−mass of dried sediments (%).

DETAILED DESCRIPTION OF THE CATALYST IN ACCORDANCE WITH THE INVENTION

The invention concerns a process for the hydrotreatment of at least one hydrocarbon feed in which at least 50% by weight of the compounds have an initial boiling point of more than 340° C. and a final boiling point of less than 540° C.

Feeds

A wide variety of feeds may be treated using the hydrocracking processes in accordance with the invention. The feed employed in the hydrocracking process in accordance with the invention is a hydrocarbon feed in which at least 50% by weight of the compounds have an initial boiling point of more than 300° C. and a final boiling point of less than 540° C., preferably in which at least 60% by weight, more preferably at least 75% by weight and more preferably at least 80% by weight of the compounds have an initial boiling point of more than 300° C. and a final boiling point of less than 540° C.

The feed is advantageously selected from LCOs (light cycle oil (light gas oils from a catalytic cracking unit)), atmospheric distillates, vacuum distillates such as, for example, gas oils from straight run distillation of crude or conversion units such as FCC, coker or visbreaking, as well as feeds deriving from units for extracting aromatics from lubricating base oils or from units for solvent dewaxing lubricating base oils, or distillates deriving from processes for desulphurization or hydroconversion in a fixed or ebullated bed of ARs (atmosphere residues) and/or VRs (vacuum residues) and/or deasphalted residues and deasphalted oils, or paraffins obtained from the Fischer-Tropsch process, used alone or as a mixture. The above list is not limiting. Said feeds preferably have a T5 boiling point of more than 300° C., and preferably more than 340° C., i.e. 95% of the compounds present in the feed have a boiling point of more than 300° C., preferably more than 340° C.

The nitrogen content of the feeds treated in the processes of the invention is usually more than 500 ppm by weight, preferably in the range 500 to 10000 ppm by weight, more preferably in the range 700 to 4000 ppm by weight and still more preferably in the range 1000 to 4000 ppm by weight. The sulphur content of the feeds treated in the processes of the invention is advantageously in the range 0.01% to 5% by weight, preferably in the range 0.2% to 4% by weight and still more preferably in the range 0.5% to 3% by weight.

The feed may optionally contain metals. The cumulative nickel and vanadium content of the feeds treated using the processes of the invention is preferably less than 1 ppm by weight.

The feed may optionally contain asphaltenes. The asphaltenes content is generally less than 3000 ppm by weight, preferably less than 1000 ppm by weight, and more preferably less than 200 ppm by weight.

In accordance with the invention, the process for hydrocracking said hydrocarbon feed in accordance with the invention is carried out at a temperature in the range 200° C. to 480° C., at a total pressure in the range 1 MPa to 25 MPa, with a ratio of the volume of hydrogen to the volume of hydrocarbon feed in the range 80 to 5000 litres per litre and with an hourly space velocity (HSV), defined as the ratio of the volume flow rate of liquid hydrocarbon feed to the volume of catalyst charged into the reactor, in the range 0.1 to 50 h$^{-1}$.

Preferably, the hydrocracking process in accordance with the invention is operated in the presence of hydrogen, in the range 250° C. to 480° C., preferably in the range 320° C. to 450° C., more preferably in the range 330° C. to 435° C., at a pressure in the range 2 to 25 MPa, preferably in the range 3 to 20 MPa, at a space velocity in the range 0.1 to 20 h$^{-1}$, preferably 0.1 to 6 h$^{-1}$, more preferably in the range 0.2 to 3 h$^{-1}$, and the quantity of hydrogen introduced is such that the volume ratio of litres of hydrogen/litres of hydrocarbon is in the range 100 to 2000 L/L.

These operating conditions used in the processes in accordance with the invention can generally be used to obtain conversions per pass of products with boiling points of below 340° C., and preferably below 370° C., of more than 15% by weight, and more preferably in the range 20% to 95% by weight.

Preferably, the catalyst comprises at least one metal from group VIB and at least one metal from group VIII of the periodic classification of the elements, used alone or as a mixture, said catalyst being a sulphide phase catalyst.

Preferably, the metals from group VIB of the periodic classification of the elements are selected from the group formed by tungsten and molybdenum, used alone or as a mixture. In accordance with a preferred embodiment, the metal from group VIB is molybdenum. In accordance with another preferred embodiment, the metal from group VIB is tungsten.

Preferably, the non-noble metals from group VIII of the periodic classification of the elements are selected from the group formed by cobalt and nickel, used alone or as a mixture. In accordance with a preferred embodiment, the non-noble metal from group VIII is cobalt. In accordance with another preferred embodiment, the non-noble metal from group VIII is nickel.

Preferably, said catalyst comprises at least one metal from group VIB in combination with at least one non-noble metal from group VIII, the non-noble metals from group VIII being selected from the group formed by cobalt and nickel, used alone or as a mixture, and the metals from group VIB being selected from the group formed by tungsten and molybdenum, used alone or as a mixture.

Advantageously, the following combinations of metals are selected: nickel-molybdenum, cobalt-molybdenum, nickel-tungsten, cobalt-tungsten; preferred combinations are: nickel-molybdenum, cobalt-molybdenum, cobalt-tungsten, nickel-tungsten, and more advantageously nickel-molybdenum and nickel-tungsten.

In the case in which the catalyst comprises at least one metal from group VIB in combination with at least one non-noble metal from group VIII, the content of metal from group VIB is advantageously in the range, as the oxide equivalent, 5% to 40% by weight with respect to the total weight of said catalyst, preferably in the range 10% to 35% by weight and highly preferably in the range 15% to 30% by weight, and the content of non-noble metal from group VIII is advantageously in the range, as the oxide equivalent, 0.5% to 10% by weight with respect to the total weight of said catalyst, preferably in the range 1% to 8% by weight and highly preferably in the range 1.5% to 6% by weight.

In the case in which the catalyst comprises at least one metal from group VIB in combination with at least one non-noble metal from group VIII, said catalyst is a sulphide catalyst.

It is also possible to use combinations of three metals, for example nickel-cobalt-molybdenum, nickel-molybdenum-tungsten, nickel-cobalt-tungsten.

Advantageously, the following combinations of metals are used: nickel-niobium-molybdenum, cobalt-niobium-molybdenum, nickel-niobium-tungsten, cobalt-niobium-tungsten; preferred associations are: nickel-niobium-molybdenum, cobalt-niobium-molybdenum. It is also possible to use combinations of four metals, for example nickel-cobalt-niobium-molybdenum.

The catalyst may also advantageously contain:
from 0 to 50% by weight of oxide, preferably from 0.1% to 15% by weight and more preferably from 0.1% to 10% by weight with respect to the total weight of catalyst, of at least one doping element selected from the group constituted by silicon, boron and phosphorus, preferably phosphorus,
from 0 to 60% by weight, preferably from 0.1% to 50% by weight, and more preferably from 0.1% to 40% by weight of oxide with respect to the total weight of catalyst, of at least one element selected from group VB and preferably niobium, and optionally also
from 0 to 20% by weight, preferably from 0.1% to 15% by weight and more preferably from 0.1% to 10% by weight of oxide, with respect to the total weight of catalyst, of at least one element selected from group VIIA, preferably fluorine.

In accordance with the invention, the catalyst support used in the process in accordance with the invention comprises at least one zeolite having at least one series of channels the opening of which is defined by a ring containing 12 oxygen atoms (12MR), and at least one binder comprising at least one amorphous mesoporous alumina, said support preferably comprising and preferably being constituted by:
1% to 80% by weight, preferably 1% to 70% by weight, more preferably 5% to 50% by weight, and highly preferably 5% to 40% by weight of said zeolite with respect to the total weight of said support,
20% to 99% by weight, preferably 30% to 99% more preferably 50% to 95% by weight, and highly preferably 60% to 95% by weight with respect to the total weight of said support, of at least said binder.

The zeolite used in the catalyst support is advantageously selected from zeolites with structure type FAU, BEA, ISV, IWR, IWW, MEI, UWY, used alone or as a mixture, and preferably from zeolites with structure type FAU and BEA, used alone or as a mixture.

In a preferred embodiment, the zeolite is selected from Y zeolite and beta zeolite, used alone or as a mixture; and preferably, the zeolite is Y zeolite or USY zeolite.

Said zeolites are advantageously defined in the classification "Atlas of Zeolite Framework Types, 6th revised edition", Ch. Baerlocher, L. B. Mc Cusker, D. H. Olson, 6th Edition, Elsevier, 2007, Elsevier.

The zeolite used in accordance with the invention may advantageously have undergone treatments in order to stabilize them or generate the mesopores. These modifications are advantageously made using one of the dealumination techniques known to the person skilled in the art, for example the hydrothermal or acid attack treatment.

In accordance with the invention, the catalyst support used in the process in accordance with the present invention is advantageously prepared using the preparation process comprising at least the following steps:
a) at least one step for precipitation, in an aqueous reaction medium, of at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being adjusted in a manner such as to obtain a percentage completion of the first step in the range 40% to 100%, the percentage completion being defined as being the proportion of alumina formed during said first precipitation step with respect to the total quantity of alumina formed at the end of the precipitation step or steps, said step being operated at a temperature in the range 20° C. to 90° C., and for a period in the range 2 minutes to 30 minutes, b) a step for hydrothermal treatment of the suspension heated to a temperature in the range 50° C. to 200° C. for a period in the range 30 minutes to 5 hours in order to obtain an alumina gel, c) a step for filtration of the suspension obtained at the end of the hydrothermal treatment step b), followed by at least one step for washing the gel obtained, d) a step for drying the alumina gel obtained at the end of step c) in order to obtain a powder, e) a step for shaping the powder obtained at the end of step d) as a mixture with at least said zeolite containing at least one series of channels the opening of which is defined by a ring of 12 oxygen atoms (12MR), in order to obtain the green material, f) a step for calcining the green material obtained at the end of step e) at a temperature in the range 500° C. to 1000° C., in the presence or absence of a stream of air containing up to 60% by volume of water.

In the case in which the percentage completion of said precipitation step a) is 100%, said precipitation step a) can generally be used to obtain a suspension of alumina with a concentration of $Al_2O_3$ in the range 20 to 100 g/L, preferably in the range 20 to 80 g/L, preferably in the range 20 to 50 g/L.

Mixing at least one basic precursor and at least one acidic precursor in the aqueous reaction medium necessitates either that at least the basic precursor or the acidic precursor should comprise aluminium, or that both the basic and acidic precursors should comprise aluminium.

The basic precursors comprising aluminium are sodium aluminate and potassium aluminate. The preferred basic precursor is sodium aluminate.

The acidic precursors comprising aluminium are aluminium sulphate, aluminium chloride and aluminium nitrate. The preferred acidic precursor is aluminium sulphate.

Preferably, the aqueous reaction medium is water.

Preferably, said step a) is operated with stirring.

Preferably, said step a) is carried out in the absence of an organic additive.

The acidic and basic precursors, whether or not they contain aluminium, are mixed, preferably in solution, in the aqueous reaction medium in proportions such that the pH of the resulting suspension is in the range 8.5 to 10.5.

In accordance with the invention, it is the relative flow rate of the acidic and basic precursors, whether or not they contain aluminium, which is selected in a manner such as to obtain a pH of the reaction medium in the range 8.5 to 10.5.

In the preferred case in which the basic and acidic precursors are respectively sodium aluminate and aluminium sulphate, the weight ratio of said basic precursor to said acidic precursor is advantageously in the range 1.6 to 2.05.

For the other basic and acidic precursors, whether or not they contain aluminium, the base/acid weight ratios are established by a plot for the neutralization of the base by the acid. A plot of this type can readily be obtained by the skilled person.

Preferably, said precipitation step a) is carried out at a pH in the range 8.5 to 10, and highly preferably in the range 8.7 to 9.9.

The acidic and basic precursors are also mixed in quantities allowing the production of a suspension containing the desired quantity of alumina, which is a function of the final concentration of alumina to be obtained. In particular, said step a) can be used to obtain 40% to 100% by weight of alumina with respect to the total quantity of alumina formed at the end of the precipitation step or steps.

In accordance with the invention, it is the flow rate of the acidic and basic precursor or precursors containing aluminium which is adjusted in order to obtain a percentage completion for the first step in the range 40% to 100%, the percentage completion being defined as the proportion of alumina formed during said precipitation step a) with respect to the total quantity of alumina formed at the end of the precipitation step or steps.

Preferably, the percentage completion of said precipitation step a) is in the range 45% to 90% and preferably in the range 50% to 85%. In the case in which the percentage completion obtained at the end of the precipitation step a) is less than 100%, a second precipitation step is necessary in order to increase the quantity of alumina formed. In this case, the percentage completion is defined as being the proportion of alumina formed during said precipitation step a) with respect to the total quantity of alumina formed at the end of the two precipitation steps of the preparation process of the invention.

Thus, depending on the intended concentration of alumina at the end of the precipitation step or steps, preferably in the range 20 to 100 g/L, the quantities of aluminium which have to be added by the acidic and/or basic precursors are calculated and the flow rate of the precursors is adjusted as a function of the concentration of said aluminium precursors which are added, of the quantity of water added to the reaction medium and of the percentage completion required for the precipitation step or steps.

The flow rates of the acidic and/or basic precursors containing aluminium depend on the dimensions of the reactor used and thus on the quantity of water added to the reaction medium.

Preferably, said precipitation step a) is carried out at a temperature in the range 10° C. to 45° C., preferably in the range 15° C. to 45° C., more preferably in the range 20° C. to 45° C. and highly preferably in the range 20° C. to 40° C.

It is important that said precipitation step a) is operated at low temperature. In the case in which said preparation process of the invention comprises two precipitation steps, precipitation step a) is advantageously carried out at a temperature below the temperature of the second precipitation step.

Preferably, said precipitation step a) is carried out for a period in the range 5 to 20 minutes, and preferably 5 to 15 minutes.

In accordance with the invention, said preparation process comprises a step b) for hydrothermal treatment of the suspension obtained from the precipitation step a), said hydrothermal treatment step being operated at a temperature in the range 60° C. to 200° C. for a period in the range 30 minutes to 5 hours.

Preferably, said hydrothermal treatment step b) is a maturation step.

Preferably, said hydrothermal treatment step b) is operated at a temperature in the range 65° C. to 150° C., preferably in the range 65° C. to 130° C., more preferably in the range 70° C. to 110° C., and highly preferably in the range 70° C. to 95° C.

Preferably, said hydrothermal treatment step b) is carried out for a period in the range 40 minutes to 5 hours, preferably in the range 40 minutes to 3 hours and more preferably in the range 45 minutes to 2 hours.

Optional Second Precipitation Step

In accordance with a preferred embodiment, in the case in which the percentage completion obtained at the end of precipitation step a) is below 100%, said preparation process preferably comprises a second precipitation step.

Said second precipitation step can be used to increase the proportion of alumina produced.

In the case in which a second precipitation step is carried out, a step for heating the suspension obtained at the end of the precipitation step a) is advantageously carried out between the two precipitation steps.

Preferably, said step for heating the suspension obtained from step a), carried out between said step a) and the second precipitation step, is operated at a temperature in the range 20° C. to 90° C., preferably in the range 30° C. to 80° C., more preferably in the range 30° C. to 70° C. and highly preferably in the range 40° C. to 65° C.

Preferably, said heating step is carried out for a period in the range 7 to 45 minutes, and preferably in the range 7 to 35 minutes.

Said heating step is advantageously carried out using any of the heating methods known to the skilled person.

In accordance with said preferred embodiment, said preparation process comprises a second step for precipitation of the suspension obtained at the end of the heating step, said second step being operated by adding to said suspension at least one basic precursor selected from sodium aluminate, potassium aluminate, ammonia, sodium hydroxide and potassium hydroxide, and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being adjusted in a manner such as to obtain a percentage completion of the second step in the range 0 to 60%, said percentage completion of the second step being defined as being the proportion of alumina formed during said second precipitation step with respect to the total quantity of alumina formed at the end of the precipitation step or steps, said step being operated at a temperature in the range 40° C. to 90° C., and for a period in the range 2 minutes to 50 minutes.

As was the case for the first precipitation step a), adding at least one basic precursor and at least one acidic precursor to the heated suspension necessitates that either at least the basic precursor or the acidic precursor comprises aluminium, or that the two precursors, basic and acidic, comprise aluminium.

The basic precursors comprising aluminium are sodium aluminate and potassium aluminate. The preferred basic precursor is sodium aluminate.

The acidic precursors comprising aluminium are aluminium sulphate, aluminium chloride and aluminium nitrate. The preferred acidic precursor is aluminium sulphate.

Preferably, said second precipitation step is operated with stirring.

Preferably, said second step is carried out in the absence of an organic additive.

The acidic and basic precursors, whether or not they contain aluminium, are mixed, preferably in solution, in the aqueous reaction medium in proportions such that the pH of the resulting suspension is in the range 8.5 to 10.5.

As was the case for the precipitation step a), it is the relative flow rate of the acidic and basic precursors, whether or not they contain aluminium, which is selected so as to obtain a pH of the reaction medium in the range 8.5 to 10.5.

In the preferred case in which the basic and acidic precursors are respectively sodium aluminate and aluminium sulphate, the weight ratio of said basic precursor to said acidic precursor is advantageously in the range 1.6 to 2.05.

For the other basic and acidic precursors, whether or not they contain aluminium, the base/acid weight ratios are established by a plot for the neutralization of the base by the acid. A plot of this type can readily be obtained by the skilled person.

Preferably, said second precipitation step is carried out at a pH in the range 8.5 to 10, and preferably in the range 8.7 to 9.9.

The acidic and basic precursors are also mixed in quantities which can be used to obtain a suspension containing the desired quantity of alumina, as a function of the final concentration of alumina to be obtained. In particular, said second precipitation step can be used to obtain 0 to 60% by weight of alumina with respect to the total quantity of alumina formed at the end of the two precipitation steps.

As was the case for the precipitation step a), it is the flow rate of the acidic and basic precursors containing aluminium which is adjusted in a manner such as to obtain a percentage completion for the second step which is in the range 0 to 60%, the percentage completion being defined as the proportion of alumina formed during said second precipitation step with respect to the total quantity of alumina formed in the precipitation step or steps.

Preferably, the percentage completion of said precipitation step a) is in the range 10% to 55%, preferably in the range 15% to 55%, the percentage completion being defined as the proportion of alumina formed during said second precipitation step with respect to the total quantity of alumina formed at the end of the two precipitation steps of the preparation process in accordance with the invention.

Thus, depending on the intended concentration of the alumina at the end of the precipitation step or steps, preferably in the range 20 to 100 g/L, the quantities of aluminium which have to be supplied by the acidic and/or basic precursors are calculated and the flow rate of the precursors is adjusted as a function of the concentration of said precursors of aluminium which are added, the quantity of water added to the reaction medium and the percentage completion required for each of the precipitation steps.

As was the case for the precipitation step a), the flow rates of the acidic and/or basic precursors containing aluminium depend on the dimensions of the reactor used, and thus on the quantity of water added to the reaction medium.

By way of example, if a 3 L reactor is used and 1 L of alumina suspension with a final $Al_2O_3$ concentration of 50 g/L is required, the intended percentage completion is 50% for the first precipitation step. Thus, 50% of the total alumina has to be supplied during the precipitation step a). The alumina precursors are sodium aluminate in a concentration of 155 g/L of $Al_2O_3$ and aluminium sulphate in a concentration of 102 g/L of $Al_2O_3$. The pH for precipitation of the first step is fixed at 9.5 and the second at 9. The quantity of water added to the reactor is 622 mL.

For the first precipitation step a) operating at 30° C. and for 8 minutes, the aluminium sulphate flow rate has to be 10.5 mL/min and the sodium aluminate flow rate is 13.2 mL/min. The weight ratio of sodium aluminate to aluminium sulphate is thus 1.91.

For the second precipitation step, operated at 70° C. for 30 minutes, the aluminium sulphate flow rate has to be 2.9 mL/min and the sodium aluminate flow rate is 3.5 mL/min. The weight ratio of sodium aluminate to aluminium sulphate is thus 1.84.

Preferably, the second precipitation step is carried out at a temperature in the range 40° C. to 80° C., preferably in the range 45° C. to 70° C. and highly preferably in the range 50° C. to 70° C.

Preferably, the second precipitation step is carried out for a period in the range 5 to 45 minutes, and preferably 7 to 40 minutes.

The second precipitation step can also be used in general to obtain a suspension of alumina with a concentration in the form of $Al_2O_3$ in the range 20 to 100 g/L, preferably in the range 20 to 80 g/L, more preferably in the range 20 to 50 g/L.

In the case in which said second precipitation step is carried out, said preparation process also advantageously comprises a second step for heating the suspension obtained at the end of said second precipitation step to a temperature in the range 60° C. to 95° C., preferably in the range 50° C. to 90° C.

Preferably, said second heating step is carried out for a period in the range 7 to 45 minutes.

Said second heating step is advantageously carried out using any of the heating methods known to the skilled person.

Said second heating step can be used to increase the temperature of the reaction medium before the suspension obtained undergoes the hydrothermal treatment step b).

In accordance with the invention, the process for the preparation of alumina in accordance with the invention also comprises a step c) for filtration of the suspension obtained at the end of hydrothermal treatment step b), followed by at least one step for washing the gel obtained. Said filtration step is carried out using methods which are known to the skilled person.

The filterability of the suspension obtained at the end of the precipitation step a) or of the two precipitation steps is improved by the presence of said step b) for final hydrothermal treatment of the suspension obtained, said hydrothermal treatment step favouring the productivity of the preparation process as well as an extrapolation of the process on an industrial scale.

Said filtration step is advantageously followed by at least one step for washing with water, and preferably by one to three washing steps using a quantity of water equal to the quantity of filtered precipitate.

The concatenation of steps a) and c) and optionally of the second precipitation step, of the second heating step and of the optional filtration step, can be used to obtain a specific alumina gel with a dispersibility index of more than 70%, a crystallite size in the range 1 to 35 nm, as well as a sulphur content in the range 0.001% to 2% by weight and a sodium content in the range 0.001% to 2% by weight, the percentages by weight being expressed with respect to the total weight of alumina gel.

The alumina gel obtained thereby has a dispersibility index in the range 70% to 100%, preferably in the range 80% to 100%, highly preferably in the range 85% to 100% and still more preferably in the range 90% to 100%.

Preferably, the alumina gel obtained has a crystallite size in the range 2 to 35 nm.

Preferably, the alumina gel obtained comprises a sulphur content in the range 0.001% to 1% by weight, preferably in the range 0.001% to 0.40% by weight, highly preferably in the range 0.003% to 0.33% by weight, and even more preferably in the range 0.005% to 0.25% by weight.

Preferably, the alumina gel obtained thereby comprises a sodium content in the range 0.001% to 1% by weight, preferably in the range 0.001% to 0.15% by weight, highly preferably in the range 0.0015% to 0.10% by weight, and 0.002% to 0.040% by weight.

In particular, the alumina gel or boehmite in the form of a powder in accordance with the invention is composed of crystallites the sizes of which, obtained by the Scherrer X ray diffraction formula along the crystallographic directions [020] and [120], are respectively in the range 2 to 20 nm and in the range 2 to 35 nm.

Preferably, the alumina gel in accordance with the invention has a crystallite size in the [020] crystallographic direction in the range 1 to 15 nm and a crystallite size in the [120] crystallographic direction in the range 1 to 35 nm.

X ray diffraction of the alumina gels or boehmites was carried out employing the conventional powder method with the aid of a diffractometer.

Scherrer's formula is a formula used in the X ray diffraction of polycrystalline powders or samples that links the width at half height of the diffraction peaks to crystallite size. It is described in detail in the reference: Appl. Cryst. (1978). 11, 102-113, Scherrer after sixty years: A survey and some new results in the determination of crystallite size, J. I. Langford and A. J. C. Wilson.

The alumina gel prepared in this manner and with a high degree of dispersibility means that the step for shaping said gel using any of the methods known to the person skilled in the art, and in particular by mixing-extrusion, by granulation and by the drop coagulation technique known as oil drop, is facilitated.

In accordance with the invention, the alumina gel obtained at the end of the filtration step c) is dried in a drying step d) in order to obtain a powder.

Said drying step is advantageously carried out at a temperature in the range 20° C. to 50° C. and for a period in the range 1 day to 3 weeks or by spray drying.

In the case in which said drying step d) is carried out at a temperature in the range 20° C. to 50° C. and for a period in the range 1 day to 3 weeks, said drying step d) may advantageously be carried out in a closed and ventilated oven; preferably, said drying step is operated at a temperature in the range 25° C. to 40° C., and for a period in the range 3 days to two weeks.

In the case in which said drying step d) is carried out by spray drying, the cake obtained at the end of the hydrothermal treatment step, optionally followed by a step for filtration, is taken up into suspension. Said suspension is then sprayed in fine droplets into a vertical cylindrical chamber in contact with a stream of hot air in order to evaporate the water in accordance with a principle which is well known to the skilled person. The powder obtained is entrained by the flow of heat to a cyclone or a sleeve filter which will separate the air from the powder. Preferably, in the case in which said drying step d) is carried out by spray drying, spray drying may be carried out in accordance with the operating protocol described in the publication Asep Bayu Dani Nandiyanto, Kikuo Okuyama, Advanced Powder Technology, 22, 1-19, 2011.

The alumina powder prepared in this manner is a mesoporous alumina with a controlled mesoporosity which has good thermal and chemical stability, with a centred, uniform and controlled mesopore size distribution.

Said alumina has a specific surface area and a pore distribution which are calibrated and adapted to its use in a process for hydrocracking said hydrocarbon feed.

Preferably, the mesoporous alumina is free from micropores.

Preferably, the support advantageously has a specific surface area of more than 100 m²/g, and a mesopore volume of greater than or equal to 0.5 mL/g, preferably greater than or equal to 0.6 mL/g.

The mesopore volume is defined as the volume included in pores with a mean diameter in the range 2 to 50 nm and is measured using the mercury intrusion method.

Preferably, the alumina which is prepared and used in the invention is a non-meso structured alumina.

Preferably, the amorphous mesoporous alumina prepared in this manner and used in the invention has a connectivity (Z) of more than 2.7, preferably a connectivity (Z) in the range 2.7 to 10, preferably in the range 2.8 to 10, highly preferably in the range 3 to 9, more preferably in the range 3 to 8 and yet more preferably in the range 3 to 7.

In accordance with the invention, the powder obtained at the end of the drying step d) is shaped in a step e) by mixing with at least said zeolite having at least one series of channels the opening of which is defined by a ring containing 12 oxygen atoms (12MR) in order to obtain a green material.

The term "green material" means the shaped material which has not undergone heat treatment steps.

Although this is not limiting, said modified zeolite or zeolite not used in the support may, for example, be in the form of a powder, ground powder, suspension, suspension which has undergone a deagglomeration treatment. Thus, for example, the zeolite may advantageously be taken up into a suspension, which may or may not be acidified, to a concentration which is adjusted to the envisaged final zeolite content on the support. This suspension, which is usually known as a slip, is then advantageously mixed with the precursors of the matrix.

Preferably, said shaping step e) is carried out by mixing-extrusion, pelletization, by the oil-drop coagulation method, by rotary plate granulation or using any other method which is well known to the person skilled in the art.

Highly preferably, said shaping step e) is carried out by mixing-extrusion.

In accordance with the invention, the green material obtained from the shaping step e) then undergoes a step f) for calcining at a temperature in the range 500° C. to 1000° C., for a period in the range 2 to 10 h, in the presence or absence of a stream of air containing up to 60% by volume of water.

Preferably, said calcining step f) is operated at a temperature in the range 540° C. to 850° C.

Preferably, said calcining step f) is operated for a period in the range 2 h to 10 h.

Said calcining step f) enables the transition of the boehmite into the final alumina.

The catalyst support obtained in this manner after steps e) and f) for shaping and calcining comprises, and is preferably constituted by, at least said zeolite and at least one binder comprising at least said amorphous mesoporous alumina.

The catalyst used in the hydrocracking process in accordance with the invention is then advantageously obtained by adding elements constituting the active phase.

The elements from group VIB, and/or the non-noble elements from group VIII, optionally the doping elements selected from phosphorus, boron, silicon and optionally the elements from groups VB and VIIA may optionally be introduced in their entirety or in part at any step of the preparation, during the synthesis of the matrix, preferably during shaping of the support, or, highly preferably, after shaping the support using any method known to the person skilled in the art. They may be introduced after shaping the support, before or after drying and calcining the support.

In accordance with a preferred embodiment of the present invention, all or a portion of the elements from groups VIB and/or the non-noble elements from group VIII and optional doping elements selected from phosphorus, boron, silicon and optional elements from groups VB and VIIA may be introduced during shaping of the support, for example, during the step for mixing the modified zeolite with a moist alumina gel.

In accordance with another preferred embodiment of the present invention, all or a portion of the elements from groups VIB and/or the non-noble elements from group VIII and optional doping elements selected from phosphorus, boron, silicon and optional elements from groups VB and VIIA may be introduced using one or more operations for impregnation of the shaped and calcined support, using a solution containing precursors of these elements. Preferably, the support is impregnated with an aqueous solution. The support is preferably impregnated using the "dry" impregnation method which is well known to the person skilled in the art.

In the case in which the catalyst of the present invention contains a non-noble metal from group VIII, the metals from group VIII are preferably introduced using one or more operations for impregnation of the shaped and calcined support, after those from group VIB or at the same time as them.

In accordance with another preferred embodiment of the present invention, the boron and silicon may also be deposited simultaneously using, for example, a solution containing a boron salt and a silicone type silicon compound.

The catalyst used in the hydrocracking process in accordance with the invention may advantageously be supplemented. In this case, at least one organic additive is added as defined above and preferably introduced into the impregnation solution containing the precursors of the active phase or in a subsequent impregnation step.

The impregnation of the elements from group VIB, and preferably niobium, may advantageously be facilitated by adding oxalic acid and optionally ammonium oxalate to the niobium oxalate solutions. Other compounds may be used in order to improve the solubility and facilitate impregnation of the niobium, as is well known to the person skilled in the art.

When at least one doping element, P and/or B and/or Si is introduced, its distribution and its localization may be determined using techniques such as the Castaing microprobe (distribution profile of the various elements), transmission electron microscopy coupled with X ray analysis of the components of the catalyst, or in fact by establishing a distribution map for the elements present in the catalyst by electron microprobe.

As an example, sources of molybdenum and tungsten may include oxides and hydroxides, molybdic acids and tungstic acids and salts thereof, in particular ammonium salts such as ammonium molybdate, ammonium heptamolybdate, ammonium tungstate, phosphomolybdic acid, phosphotungstic acid and salts thereof, silicomolybdic acid, silicotungstic acid and salts thereof. Preferably, oxides and ammonium salts are used, such as ammonium molybdate, ammonium heptamolybdate or ammonium tungstate.

The sources of non-noble elements from group VIII which may be used are well known to the skilled person. As an example, for non-noble metals, nitrates, sulphates, hydroxides, phosphates, or halides may be used, for example chlorides, bromides or fluorides, or carboxylates, for example acetates or carbonates.

The preferred source of phosphorus is orthophosphoric acid, $H_3PO_4$, but its salts and esters such as ammonium phosphates are also suitable. The phosphorus may, for example, be introduced in the form of a mixture of phosphoric acid and a basic organic compound containing nitrogen such as ammonia, primary and secondary amines, cyclic amines, compounds from the pyridine family and quinolines and compounds from the pyrrole family. Tungsto-phosphoric or phospho-molybdic acids may be employed.

The phosphorus content is adjusted, without in any way limiting the scope of the invention, so as to form a mixed compound in solution and/or on the support, for example tungsten-phosphorus or molybdenum-tungsten-phosphorus. These mixed compounds may be heteropolyanions. These compounds may be Anderson heteropolyanions, for example.

The source of boron may be boric acid, preferably orthoboric acid, $H_3BO_3$, ammonium biborate or pentaborate, boron oxide, or boric esters. The boron may, for example, be introduced in the form of a mixture of boric acid, hydrogen peroxide and a basic organic compound containing nitrogen such as ammonia, primary and secondary amines, cyclic amines, compounds from the pyridine family and quinolines and compounds from the pyrrole family. The boron may, for example, be introduced using a solution of boric acid in a water/alcohol mixture.

Many sources of silicon may be employed. Thus, it is possible to use ethyl orthosilicate $Si(OEt)_4$, siloxanes, polysiloxanes, silicones, silicone emulsions, halogen silicates such as ammonium fluorosilicate $(NH_4)_2SiF_6$ or sodium fluorosilicate $Na_2SiF_6$. Silicomolybdic acid and its salts, or silicotungstic acid and its salts may also advantageously be used. The silicon may, for example, be added by impregnating ethyl silicate in solution in a water/alcohol mixture. The silicon may, for example, be added by impregnation of a silicone or silicic acid type silicon compound suspended in water.

The source of elements from group VB which may be used are well known to the skilled person. As an example, the niobium sources which may be used include oxides such as diniobium pentoxide $Nb_2O_5$, niobic acid $Nb_2O_5.H_2O$, niobium hydroxides and polyoxoniobates, niobium alkoxides with formula $Nb(OR_1)_3$ where $R_1$ is an alkyl radical, niobium oxalate $Nb(HC_2O_4)_5$, or ammonium niobate. Preferably, niobium oxalate or ammonium niobate is used.

Sources of elements from group VIIA which may be used are well known to the skilled person. As an example, the fluoride anions may be introduced in the form of hydrofluoric acid or salts thereof. Said salts are formed with alkali metals, ammonium or an organic compound. In this latter case, the salt is advantageously formed in the reaction mixture by reaction between the organic compound and hydrofluoric acid. It is also possible to use hydrolysable compounds which can liberate fluoride anions into the water, such as ammonium fluorosilicate $(NH_4)_2SiF_6$, silicon tetrafluoride $SiF_4$ or sodium hexafluoride $Na_2SiF_6$. The fluorine may, for example, be introduced by impregnation of an aqueous solution of hydrofluoric acid or ammonium fluoride.

The catalysts used in the process in accordance with the invention are advantageously in the form of spheres or extrudates. However, it is advantageous for the catalyst to be in the form of extrudates with a diameter in the range 0.5 to 5 mm and more particularly in the range 0.7 to 2.5 mm. The shapes are cylindrical (they may or may not be hollow), twisted cylinders, multi-lobed (2, 3, 4 or 5 lobes, for example), or rings. The cylindrical shape is preferably used, but any other form may be used. The catalysts in accordance with the invention may optionally be manufactured and employed in the form of crushed powder, tablets, rings, beads or wheels.

The metals from group VIB and/or group VIII of said catalyst are in the sulphide form.

Prior to injecting the feed, the catalysts used in the processes of the present invention initially undergo a sulphurization treatment to transform at least a portion of the metallic species into the sulphide before they are brought into contact with the feed to be treated. This treatment for activation by sulphurization is well known to the skilled person and may be carried out using any method which is already described in the literature, either in situ, i.e. in the reactor, or ex situ.

A conventional sulphurization method which is well known to the skilled person consists of heating the catalyst in the presence of hydrogen sulphide (pure or, for example, in a stream of a mixture of hydrogen/hydrogen sulphide) to a temperature in the range 150° C. to 800° C., preferably in the range 250° C. to 600° C., generally in a traversed bed reaction zone.

The hydrocracking process in accordance with the invention may advantageously be carried out in accordance with any of the embodiments known in the prior art.

Said process may advantageously be carried out in one or two steps, in one or more reactor(s), in fixed bed or ebullated bed mode.

The invention will now be illustrated by the following examples, which are not in any way limiting in nature.

EXAMPLES

Example 1 (Comparative): Preparation of a Support 51 (not in Accordance) Comprising an Alumina Prepared in Accordance with the U.S. Pat. No. 7,790,562 Shaped with a Y Zeolite Firstly, an alumina gel which was not in accordance with the invention was synthesized, in that Example 2 was implemented in accordance with the preparation process described in the U.S. Pat. No. 7,790,562. In particular, the process for the preparation of an alumina gel in accordance with Example 2 did not include a step for heat treatment of the suspension obtained after the precipitation steps and in that the first precipitation step a) did not produce a quantity of alumina of more than 40% with respect to the total quantity of alumina formed at the end of the second precipitation step.

The synthesis was carried out in a 7 L reactor, producing a final 5 L of suspension in 2 precipitation steps. The quantity of water added to the reactor was 3868 mL.

The final intended concentration of alumina was 30 g/L.

A first step for co-precipitation of aluminium sulphate $Al_2(SO_4)$ and sodium aluminate NaAlOO was carried out at 30° C. and at a pH of 9.3 for a period of 8 minutes. The concentrations of the aluminium precursors used were as follows: $Al_2(SO_4)$=102 g/L as $Al_2O_3$ and NaAlOO=155 g/L as $Al_2O_3$. Stirring was at 350 rpm throughout the synthesis.

A solution of aluminium sulphate $Al_2(SO_4)$ was continuously added for 8 minutes at a flow rate of 19.6 mL/min to a solution of sodium aluminate NaAlOO in a base/acid weight ratio of 1.80 in order to adjust the pH to a value of 9.3. The temperature of the reaction medium was maintained at 30° C.

A suspension containing an alumina precipitate was obtained.

The final intended concentration of alumina was 30 g/L, and so the flow rate of the aluminium sulphate $Al_2(SO_4)$ and sodium aluminate NaAlOO precursors containing aluminium introduced into the first precipitation step were respectively 19.6 mL/min and 23.3 mL/min.

These flow rates for the acidic and basic precursors containing aluminium allowed a percentage completion of 30% to be obtained at the end of the first precipitation step.

The temperature of the suspension obtained was then raised from 30° C. to 57° C.

A second step for co-precipitation of the suspension obtained was then carried out by adding aluminium sulphate $Al_2(SO_4)$ at a concentration of 102 g/L as $Al_2O_3$ and sodium aluminate NaAlOO at a concentration of 155 g/L as $Al_2O_3$. A solution of aluminium sulphate $Al_2(SO_4)$ was thus added continuously to the heated suspension obtained at the end of the first precipitation step over 30 minutes at a flow rate of 12.8 mL/min, and a solution of sodium aluminate NaAlOO in a base/acid weight ratio of 1.68 in order to adjust the pH to a value of 8.7. The temperature of the reaction medium in the second step was maintained at 57° C.

A suspension containing an alumina precipitate was obtained.

The intended final concentration of alumina was 30 g/L, and so the flow rate of the aluminium sulphate $Al_2(SO_4)$ and sodium aluminate NaAlOO precursors containing aluminium introduced in the second precipitation step were respectively 12.8 mL/min and 14.1 mL/min.

These flow rates for the acidic and basic precursors containing aluminium were used in order to obtain a percentage completion of 70% at the end of the second precipitation step.

The suspension obtained thereby did not undergo a heat treatment step.

The suspension obtained was then filtered by displacing water on a Buchner frit type apparatus and the alumina gel obtained was washed 3 times with 5 L of distilled water at 70° C. The time for filtration and for the washes was 4 h.

The characteristics of the alumina gel obtained thereby are summarized in Table 1.

TABLE 1

Characteristics of alumina gel obtained in accordance with Example 1

| | Alumina gel of Example 1 |
|---|---|
| Dispersibility index Ta = 10% (%) | 60 |
| Size, [020] (nm) | 2.9 |

TABLE 1-continued

Characteristics of alumina gel obtained in accordance with Example 1

| | Alumina gel of Example 1 |
|---|---|
| Size, [120] (nm) | 4.1 |
| Sodium Na (ppm) | 0.011 |
| Sulphur S (ppm) | 0.057 |
| Filtration time | 4 h |

The alumina gel was then dried by spray drying, using an inlet temperature of 250° C. and an outlet temperature of 130° C.

The dried alumina gel was introduced into a Brabender type mixer as a mixture with a USY zeolite powder with the characteristics described in Table 2.

TABLE 2

Characteristics of the USY zeolite.

| Nature of the zeolite | Denomination | Cationic form | Molar ratio $SiO_2/Al_2O_3$ | Lattice parameter (Å) | Surface area (m$^2$/g) |
|---|---|---|---|---|---|
| USY | USY-1 | H$^+$ | 23 | 24.306 | 906 |

Water acidified with nitric acid to a total acid content of 2%, expressed by weight with respect to the weight of dry gel introduced into the mixer, was added over 5 minutes while mixing at 20 rpm. The acid mixing was continued for 10 minutes. A neutralization step was then carried out by adding an ammonia solution to the mixer, to a degree of neutralization of 20%, expressed as the weight of ammonia with respect to the quantity of nitric acid introduced into the mixer for the acidification step. Mixing was continued for 3 minutes.

The paste obtained was then extruded through a 2 mm trilobe die. The support was obtained after shaping and extrusion by mixing 20% by weight of USY-1 zeolite with 80% of alumina gel.

The extrudates obtained were dried at 100° C. overnight then calcined for 2 h at 600° C.

The characteristics of the support formed are reported in Table 3:

TABLE 3

Characteristics of support S1 obtained in accordance with Example 1

| | S1 |
|---|---|
| $S_{BET}$(m$^2$/g) | 342 |
| VHg (mL/g) | 0.63 |
| Dp(nm) | 10.1 |

Example 2: (in Accordance with the Invention): Preparation of Supports S2 and S3 (in Accordance with the Invention) Comprising an Alumina Prepared in Accordance with the Invention and a USY-1 Zeolite Firstly, the two supports S2 and S3 were prepared in accordance with a preparation process in accordance with the invention in a 7 L reactor and with a final suspension of 5 L in 3 steps, two precipitation steps followed by a maturation step.

The final intended concentration of alumina was 45 g/L. The quantity of water added to the reactor was 3267 mL. Stirring was at 350 rpm throughout the synthesis.

A first step for co-precipitation in water of aluminium sulphate $Al_2(SO_4)$ and sodium aluminate NaAlOO was carried out at 30° C. and at a pH of 9.5 for a period of 8 minutes. The concentrations of the aluminium precursors used were as follows: $Al_2(SO_4)$=102 g/L as $Al_2O_3$ and NaAlOO=155 g/L as $Al_2O_3$.

A solution of aluminium sulphate $Al_2(SO_4)$ was continuously added for 8 minutes at a flow rate of 69.6 mL/min to a solution of sodium aluminate NaAlOO at a flow rate of 84.5 mL/min in a base/acid weight ratio of 1.84 in order to adjust the pH to a value of 9.5. The temperature of the reaction medium was maintained at 30° C.

A suspension containing an alumina precipitate was obtained.

The final intended concentration of alumina was 45 g/L, and so the flow rate of the aluminium sulphate $Al_2(SO_4)$ and sodium aluminate NaAlOO precursors containing aluminium introduced into the first precipitation step were respectively 69.6 mL/min and 84.5 mL/min.

These flow rates for the acidic and basic precursors containing aluminium allowed a percentage completion of 72% to be obtained at the end of the first precipitation step.

The temperature of the suspension obtained was then raised from 30° C. to 68° C.

A second step for co-precipitation of the suspension obtained was then carried out by adding aluminium sulphate $Al_2(SO_4)$ at a concentration of 102 g/L as $Al_2O_3$ and sodium aluminate NaAlOO at a concentration of 155 g/L as $Al_2O_3$. A solution of aluminium sulphate $Al_2(SO_4)$ was thus added continuously to the heated suspension obtained at the end of the first precipitation step over 30 minutes at a flow rate of 7.2 mL/min, and a solution of sodium aluminate NaAlOO in a base/acid weight ratio of 1.86 in order to adjust the pH to a value of 9. The temperature of the reaction medium in the second step was maintained at 68° C.

A suspension containing an alumina precipitate was obtained.

The intended final concentration of alumina was 45 g/L, and so the flow rate of the aluminium sulphate $Al_2(SO_4)$ and sodium aluminate NaAlOO precursors containing aluminium introduced in the second precipitation step were respectively 7.2 mL/min and 8.8 mL/min.

These flow rates for the acidic and basic precursors containing aluminium were used in order to obtain a percentage completion of 28% at the end of the second precipitation step.

The temperature of the suspension obtained was then raised from 68° C. to 90° C.

The suspension then underwent a hydrothermal treatment step in which it was held at 90° C. for 60 minutes.

The suspension obtained was then filtered by displacing water on a Buchner frit type apparatus and the alumina gel obtained was washed 3 times with 5 L of distilled water. The time for filtration and for the washes was 3 h.

The characteristics of the alumina gel obtained thereby are summarized in Table 4.

TABLE 4

Characteristics of alumina gel obtained in accordance with Example 2

| | Alumina gel of Example 2 |
|---|---|
| Dispersibility index Ta = 10% (%) | 100 |
| Size, [020] (nm) | 2.8 |
| Size, [120] (nm) | 3.5 |
| Sodium Na (%) | 0.074 |

TABLE 4-continued

Characteristics of alumina gel obtained in accordance with Example 2

| | Alumina gel of Example 2 |
|---|---|
| Sulphur S (%) | 0.0364 |
| Filtration time | 3 h |

A gel with a dispersibility index of 100% was thus obtained.

The alumina gel was then dried by spray drying, using an inlet temperature of 250° C. and an outlet temperature of 130° C. The gel dried by spray drying was termed Gel No. 1.

The alumina gel obtained in accordance with Example 3 was dried in a ventilated oven at 35° C. for 4 days. The oven dried gel was termed Gel No. 2.

The dried alumina gels Nos. 1 and 2 were then respectively introduced into a Brabender type mixer as a mixture with a USY zeolite powder with the characteristics described in Table 2.

Water acidified with nitric acid to a total acid content of 2%, expressed by weight with respect to the weight of dry gel introduced into the mixer, was added over 5 minutes while mixing at 20 rpm. The acid mixing was continued for 10 minutes. A neutralization step was then carried out by adding an ammonia solution to the mixer, to a degree of neutralization of 20%, expressed as the weight of ammonia with respect to the quantity of nitric acid introduced into the mixer for the acidification step. Mixing was continued for 3 minutes.

The paste obtained was then extruded through a 2 mm trilobe die. The extrudates obtained were dried at 100° C. overnight then calcined for 2 h at 600° C.

Two supports, S2 and S3, each comprising 20% by weight of USY-1 zeolite and 80% of alumina gel Nos 1 and 2, were obtained.

The characteristics of the supports S2 and S3 formed are reported in Table 5:

TABLE 5

Characteristics of supports S2 and S3 obtained in accordance with Example 2

| | Denomination of support | |
|---|---|---|
| | S2 | S3 |
| | Type of drying of gel | |
| | Spray drying at 250° C. | Oven at 35° C. |
| $S_{BET}(m^2/g)$ | 346 | 341 |
| $V_{Hg}$ (mL/g) | 0.65 | 0.64 |
| Dp(nm) | 10.1 | 10.3 |

Example 3: Preparation of Catalysts C1 (not in Accordance), C2 (in Accordance), C3 (in Accordance), Respectively from Supports S1 to S3

A solution composed of molybdenum oxide, nickel hydroxycarbonate and phosphoric acid was added to supports S1 to S3 by dry impregnation in order to obtain a formulation of 2.5/15.0/2, expressed as the % by weight of oxides with respect to the quantity of dry material for the final catalysts C1 to C3. After dry impregnation, the extrudates were allowed to mature in a water-saturated atmosphere for 12 h, then they were dried overnight at 110° C.

then finally calcined at 450° C. for 2 hours in order to produce catalyst C1, not in accordance with the invention, and catalysts C2 and C3, in accordance with the invention.

Example 4: Comparison of Catalysts C1 to C3 in the Hydrocracking of a Vacuum Distillate The catalysts prepared as described in the above examples were used under high conversion hydrocracking conditions (60-100%). The oil feed was a vacuum distillate hydrotreated over a commercial catalyst based on nickel and molybdenum on alumina the principal characteristics of which are given in Table 6.

TABLE 6

Characteristics of the hydrotreated feed used

| | |
|---|---|
| Density (15/4) | 0.8792 |
| Sulphur (ppm by wt) | 54 |
| Nitrogen (ppm by wt) | 5 |
| Simulated distillation | |
| Initial point | 110° C. |
| 10% point | 291° C. |
| 50% point | 306° C. |
| 90% point | 534° C. |
| End point | 606° C. |

0.6% by weight of aniline and 2% by weight of dimethyldisulphide was added to the hydrotreated feed in order to simulate the partial pressures of $H_2S$ and $NH_3$ present in the hydrocracking step and generated during the previous hydrothermal of the VD. The feed prepared in this manner was injected into the test hydrocracking unit which comprised a fixed bed reactor in upflow mode into which 50 mL of catalyst was introduced. The catalysts were sulphurized using a straight run gas oil mixture supplemented with 4% by weight of dimethyldisulphide and 1.6% by weight of aniline at 350° C. It should be noted that any in situ or ex situ method for sulphurization is suitable. Once sulphurization had been carried out, the feed described in Table 10 could be transformed. The operating conditions below were set: total pressure of 14 MPa, hourly space velocity of 1.5 $h^{-1}$ and a volume of $H_2$/feed ratio of 1000 NL/L. The hourly space velocity is defined as the ratio of the flow rate by volume of incoming liquid feed over the volume of feed introduced. The $H_2$/feed volume ratio is obtained by the ratio of the volume flow rates under normal temperature and pressure conditions.

The catalytic performances are expressed with respect to those obtained for the reference catalyst C1, not in accordance with the invention, by the difference in temperature which is required in order to obtain a gross conversion of 70% (denoted T70) and by the differences in yields of gasoline and middle distillates (jet fuel and gas oil) at this same gross conversion.

These catalytic performances were measured on the catalyst after a stabilization period, generally at least 48 hours, had expired.

The gross conversion GC is taken to be equal to:

GC=% by weight of 370° C. minus of the effluent,

Where "370° C. minus" represents the fraction distilled at a temperature of 370° C. or less.

The jet fuel yield (kerosene, 150-250, Yld Kero below) was equal to the % by weight of compounds with a boiling point in the range 150° C. to 250° C. in the effluents. The gas oil yield (250-380) was equal to the % by weight of compounds with a boiling point in the range 250° C. to 380° C. in the effluents.

The reaction temperature was fixed in a manner such as to obtain a gross conversion GC equal to 70% by weight. In Table 7, we have reported the reaction temperature and the light and middle distillate yields for the catalysts described in the examples above.

TABLE 7

Catalytic performances of catalysts C1 to C3 in hydrocracking

| Catalyst | T70 ° C. | Jet fuel yld % by wt | Gas oil yld % by wt | Middle distillate yld % by wt |
|---|---|---|---|---|
| C1, not in accordance | base | base | base | base |
| C2, in accordance | base | base + 0.4 | base + 1.1 | base + 1.5 |
| C3, in accordance | base-1 | base + 0.6 | base + 1.0 | base + 1.6 |

Catalysts C2 and C3, in accordance with the invention, had better catalytic performances than catalyst C1, not in accordance with the invention. Compared with catalyst C1, the catalysts C2 and C3 exhibited an increase in yield for middle distillates of 1.5 and 1.6 points respectively. Finally, there was no significant difference in catalytic performance between the catalysts C2 and C3, which demonstrated that the type of drying of the alumina in accordance with the invention had no impact on the catalytic performances obtained.

The invention claimed is:

1. A process for hydrocracking at least one hydrocarbon feed in which at least 50% by weight of the compounds have an initial boiling point of more than 300° C. and a final boiling point of less than 540° C., at a temperature in the range 200° C. to 480° C., at a total pressure in the range 1 MPa to 25 MPa, with a ratio of the volume of hydrogen to the volume of hydrocarbon feed in the range 80 to 5000 litres per litre and with an hourly space velocity (HSV), defined as the ratio of the volume flow rate of liquid hydrocarbon feed to the volume of catalyst charged into the reactor, in the range 0.1 to 50 $h^{-1}$, said process using at least one catalyst comprising at least one metal from group VIB and/or at least one metal from group VIII of the periodic classification and a support comprising at least one zeolite containing at least one series of channels the opening of which is defined by a ring containing 12 oxygen atoms (12MR), and at least one binder comprising at least one amorphous mesoporous alumina, said support comprising at least said zeolite and at least said binder being prepared in accordance with at least the following steps:
a) a first step for alumina precipitation, in an aqueous reaction medium, of at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being adjusted in a manner such as to obtain a percentage completion of said first precipitation step in the range of 45% to 90%, the percentage completion being defined as being the proportion of alumina formed during said first precipitation step with respect to the total quantity of alumina formed at the end of step c) of the preparation process, said step being operated at a temperature in the range of 20° C. to 40° C., and for a period in the range of 2 minutes to 30 minutes, to obtain a first suspension, a1) a step for heating the first suspension obtained at the end of step a) and carried out between step a) and step a'), at a temperature between 20° C. to 90° C. for a period between 7 to 45 minutes, a') a second step for precipitation of the heated first suspension obtained at the end of the heating step a1), comprising adding to said heated first suspension at least one basic precursor selected from sodium aluminate, potassium aluminate, ammonia, sodium hydroxide and potassium hydroxide, and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected in a manner such as to obtain a pH of the reaction medium in the range 8.5 to 10.5 and the flow rate of the acidic and basic precursor or precursors containing aluminium being adjusted in a manner such as to obtain a percentage completion of the second precipitation step in the range of 10 to 55%, said percentage completion of the second precipitation step being defined as being the proportion of alumina formed during said second precipitation step with respect to the total quantity of alumina formed at the end of the precipitation steps, said second precipitation step being operated at a temperature between 40° C. and 90° C., and for a period between 2 minutes and 50 minutes, to obtain a second suspension, a2) a second step for heating the second suspension obtained at the end of said second precipitation step a') to a temperature between 50° C. and 95° C., b) a step for hydrothermal treatment of the heated second suspension obtained at the end of the second heating step a2), by heating to a temperature in the range 50° C. to 200° C. for a period in the range 30 minutes to 5 hours in order to obtain an alumina gel, c) a step for filtration of the suspension obtained at the end of the hydrothermal treatment step b), followed by at least one step for washing the alumina gel obtained, d) a step for drying the alumina gel obtained at the end of step c) in order to obtain a powder, e) a step for shaping the powder obtained at the end of step d) as a mixture with at least said zeolite containing at least one series of channels the opening of which is defined by a ring of 12 oxygen atoms (12MR), in order to obtain a green material, f) a step for calcining the green material obtained at the end of step e) at a temperature in the range 500° C. to 1000° C., in the presence or absence of a stream of air containing up to 60% by volume of water.

2. The process as claimed in claim 1, in which the metal from group VIB is selected from the group formed by tungsten and molybdenum, used alone or as a mixture.

3. The process as claimed in claim 1, in which the metal from group VIII is selected from the group formed by cobalt and nickel, used alone or as a mixture.

4. The process as claimed in claim 1, in which said catalyst comprises at least one metal from group VIB in combination with at least one non-noble metal from group VIII, the content of the metal from group VIB being in the range, as the oxide equivalent, 5% to 40% by weight with respect to the total weight of said catalyst and the content of non-noble metal from group VIII being in the range, as the oxide equivalent, 0.5% to 10% by weight with respect to the total weight of said catalyst.

5. The process as claimed in claim 1, in which the zeolite used in the catalyst support is selected from zeolites with structure type FAU, BEA, ISV, IWR, IWW, MEI or UWY, used alone or as a mixture.

6. The process as claimed in claim 5, in which the zeolite is selected from zeolites with structure type FAU and BEA, used alone or as a mixture.

7. The process as claimed in claim 6, in which the zeolite is selected from Y zeolite and beta zeolite, used alone or as a mixture.

8. The process as claimed in claim 1, in which the percentage completion of said first precipitation step a) is in the range 50% to 85%.

9. The process as claimed in claim 1, in which said at least one hydrocarbon feed is selected from light gas oils obtained from a catalytic cracking unit, atmospheric distillates, vacuum distillates, feeds from units for the extraction of aromatics from lubricating base oils or obtained from solvent dewaxing lubricating base oils, the distillates from processes for fixed bed or ebullated bed desulphurization or hydroconversion of atmospheric residues and/or vacuum residues and/or deasphalted oils, deasphalted oils and paraffins obtained from the Fischer-Tropsch process, used alone or as a mixture.

\* \* \* \* \*